Oct. 22, 1940.  W. E. RENNER  2,219,199
SEALED MOTOR CONTROL
Filed June 23, 1939
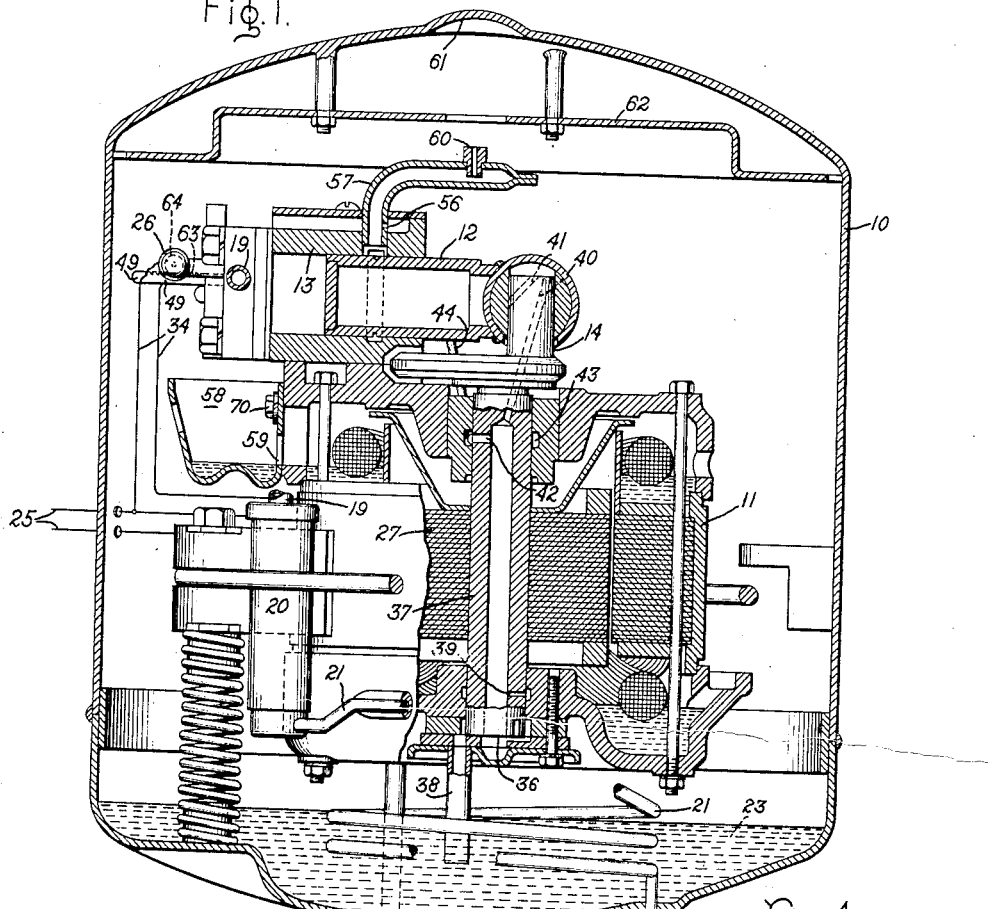
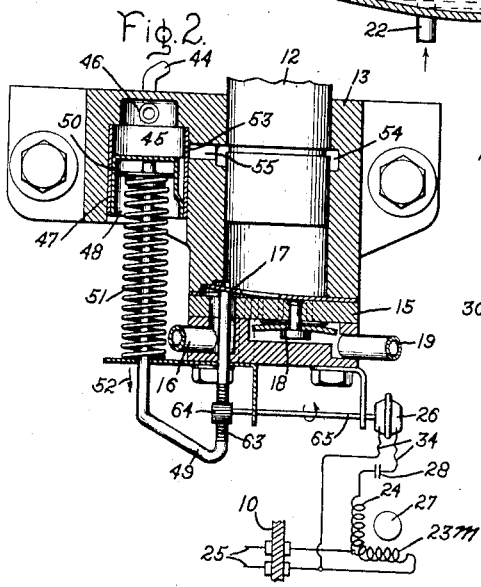
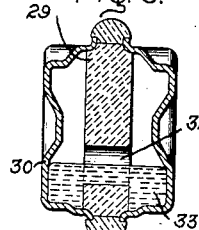
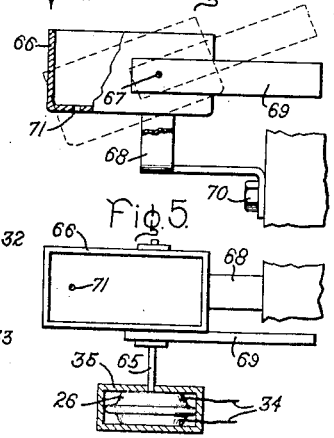
Inventor:
William E. Renner,
by Harry E. Dunham
His Attorney.

Patented Oct. 22, 1940

2,219,199

UNITED STATES PATENT OFFICE 2,219,199

SEALED MOTOR CONTROL

William E. Renner, Schenectady, N. Y., assignor to General Electric Company, a corporation of New York Application June 23, 1939, Serial No. 280,748

6 Claims. (Cl. 230—31)

My invention relates to the control of an electric motor which drives apparatus which is sealed in a hermetically closed casing, the control in question, the motor, and the driven apparatus all being contained within the casing. In particular my invention relates to control means for opening the starting winding of a single phase motor which drives the compressor of sealed refrigerating apparatus.

Heretofore such control means has been placed outside the casing and has generally been in the form of a relay responsive to the starting current of the motor. This requires the sealing of an extra circuit wire through the wall of the casing and rather an expensive relay which was not entirely satisfactory under all motor starting conditions.

In accordance with my invention, I employ means inside of the casing for opening the starting winding circuit thus reducing the number of circuit wires passing through the sealed wall of the casing, and the length of the control circuit. My control means in itself is less costly than an external current relay and is made to respond so as to perform its function more exactly than a current relay under certain conditions.

The features of my invention which are believed to be novel and patentable will be pointed out in the claims appended hereto. For a better understanding of my invention, reference is made in the following description to the accompanying drawing in which Fig. 1 represents a sectional view through a sealed casing containing an electric motor-driven refrigerator unit to which my invention has been applied. Fig. 2 is a sectional view through the valve end of the compressor showing an unloader mechanism for the refrigerating unit and a sealed mercury switch in the starting winding circuit of the motor which is controlled in response to the operation of the unloader. Fig. 3 is a sectional view through a preferred form of mercury switch and Figs. 4 and 5 are side and plan views of a tiltable oil cup which may be used for operating the control switch.

In Fig. 1 I have shown a sealed motor-driven compressor unit for a domestic refrigerator of the type fully described in United States Patent 2,102,403, December 14, 1937, to Bixler assigned to the same assignee as the present invention. Such a unit includes the hermetically sealed casing 10, containing an electric motor 11 which drives the piston 12 of a compressor cylinder 13 through a crank mechanism 14. The valve chamber 15 of the compressor is shown in section in Fig. 2. In the operation of such a refrigerating unit a refrigerant such as sulphur dioxide at low pressure contained in casing 10 is drawn into the cylinder 13 through an inlet conduit 16 and inlet valve 17, is compressed in the cylinder, and expelled through an exhaust valve at 18 and a conduit 19. The compressed refrigerant passes through a muffler 20 and then through a conduit 21 out of the casing 10. The refrigerant is then cooled and liquefied and evaporated again to perform its refrigerating function before returning to casing 10 through conduit 22. Conduit 22 opens into casing 10 above the level of lubricating oil 23 which is also contained within the casing 10.

The motor 11 which drives the compressor is a single phase induction motor which has a phase-splitting winding used for starting purposes and which is cut out after the motor comes up to speed. In Fig. 2, $23^m$ represents the main or running winding of the motor, and 24 the phase-splitting starting winding. These windings are connected in parallel across the supply leads 25 and a switch represented at 26 is contained in the starting winding circuit to open such circuit after the motor has started and to close it again when the motor is stopped. The rotor of the motor is represented in Figs. 1 and 2 by reference character 27. Such motor-operated refrigerator units are called upon to start and stop frequently in accordance with the refrigerating requirements and it will be understood that a suitable switch, not shown, will be contained in the supply leads external of casing 10 for this purpose. An example of such a switch as well as a prior art starting winding relay operated switch external to the casing 10 are shown in U. S. Patent 1,921,126, August 8, 1933, to Hutt.

The required difference in phase between the currents in the main and starting windings for starting purposes may be, and generally is, obtained by the difference in the time constants of the windings themselves. For example, the starting winding 24 may have high resistance as compared to the resistance of the main winding $23^m$. It is also possible to include a phase-modifying impedance in the starting winding circuit external to the motor but within the casing 10. In Fig. 1 the element 28 may represent a condenser for this purpose. Such condenser or other device, if used, will, of course, be suitably protected from the corrosive sulphur dioxide gas and the oil contained within casing 10.

Where, as in this invention, a switch is contained within the casing 10, it is essential that its contacts be protected from exposure to the corrosive sulphur dioxide gas. Hence I prefer to employ a mercury switch of the construction shown in cross section in Fig. 3. Such a switch comprises a sealed vessel, cylindrical in shape, with a partition of refractory insulating material 29 dividing the vessel into two axially displaced compartments. The end walls 30 are of conducting material and comprise the switch terminals and these terminals are insulated from each other by the central partition and a sealing ring 31 of a material such as glass. The glass seal 31 holds all of the parts together and completely seals the vessel. The partition 29 contains an off-center opening 32 and the vessel contains sufficient mercury 33 so that by rotating the switch about its central horizontal axis, the opening 32 is rotated above or below the mercury level to open or close the switch. In Fig. 3 the opening is sufficiently beneath the level of the mercury that the mercury floods the opening and connects the two end walls 30 together. Rotation of the switch to bring the opening 32 completely above the level of the mercury will open the switch. The connecting wires 34 are soldered or brazed to the two conductor end walls as shown in Fig. 5 and the switch may be further enclosed in a supporting and protecting housing 35 of suitable insulating material. The details of construction of such a switch and its supporting housing are not important and the structure described is merely for the purpose of giving one example of an inexpensive sealed switch suitable for the intended service.

This switch is contained within the sealed refrigerator casing 10 close to the motor. Hence the lead wires thereto are relatively short and an opening or openings therefor through the wall of casing 10 are not required. The parallel connection of the main and starting windings of the motor is made entirely within the sealed casing 10. The external wiring can be made simpler and neater and more nearly fool proof. Extensive tests indicate that such a switch may be sealed in the casing 10 and give trouble-free operation for the expected life of the remainder of the apparatus at a cost appreciably less than an external relay operated switch for the same purpose.

It remains to be described how the switch may be operated in response to the speed of the motor to open the starting winding of the motor at the proper speed when the motor is started and to reconnect the starting winding again when the motor is shut down.

As described in Patent 2,102,403, the motor 11 drives an oil pump 36 located at the lower end of the hollow vertical motor shaft 37. Oil from reservoir 23 is drawn up through a pipe 38 and is pumped up through hollow shaft 37 when the motor is in operation. This oil supply furnishes lubrication for the lower motor bearing through an orifice 39, for the crank mechanism 14 through conduits 40 and 41 and to the upper motor bearing through an orifice 42. The orifice 42 connects with a recess 43 surrounding the shaft which is thus kept full of oil under pressure when the motor is in operation. Oil is piped through a tube 44 from recess 43 upward to an unloader cylinder 45 located to the rear of the compressor cylinder 13 as viewed in Fig. 1. This unloader cylinder and the unloader mechanism are shown in Fig. 2. The oil pipe 44 enters the rear end of cylinder space 45 at the opening indicated at 46 in Fig. 2. The purpose of this unloader, as heretofore used, is to hold the inlet valve 17 of the compressor open and thus relieve the apparatus of load when the apparatus is being started up and shut down, and is thus operating below normal speed or when, for any reason, there is an inadequate supply of oil pumped for lubrication purposes.

The unloader includes a movable piston consisting of parts 47 and 48, to the forward side of which is secured the U-shaped rod 49 by means of the disk 50. When there is no oil pressure behind piston 47, 48, a compression spring 51 holds the piston and the rod 49 in the position shown in Fig. 2 with valve 17 forced open. Hence, when the motor 11 is started, the valve 17 is held open and the apparatus starts up without the compressor doing any compressing. As soon as the motor starts, oil is pumped and very promptly enters the unloader cylinder and builds up a pressure behind its piston and forces the piston outwardly in the direction of the arrow 52. At the same time oil from the unloader cylinder escapes through an orifice 53 in the side wall of the piston part 47 to an annular recess 54 about the compressor piston. The orifice 53 moves outwardly with the piston and the parts are designed so that until the motor reaches about 60 per cent speed, sufficient oil is by-passed through orifice 53 to prevent closing of valve 17. At about 60 per cent motor speed, the orifice opening is reduced by reason of its being partially closed as it moves over the edge of the cooperating opening at 55 in the cylinder wall and hence the oil pressure increases materially and definitely moves the unloader to a position where the inlet valve 17 may close and then the compressor start compressing. At normal operating speed the unloader piston has moved outwardly sufficiently that the rear end of piston part 47 has partially uncovered opening 55 so that an adequate supply of oil is supplied to the recess 54 for additional purposes and at the same time the pressure in the unloader piston is held steady at the proper value to hold rod 49 out in compressor operating position.

Some of the oil conveyed to recess 54 is used to lubricate the compressor piston and form an oil seal therefor. Some of this oil is forced out of an orifice 56 in a riser tube 57 and drains down and over the front of the compressor cylinder structure and into a pan 58. This pan has an overflow opening 59 from which oil flows out and downward through cooling recesses in the motor and the oil on its way back to the reservoir thus absorbs heat from the motor and helps to keep it cool. The main body of oil which flows into the riser 57 is sprayed upward from a nozzle 60 and is deflected by the dome at 61 and guide 62 so that it runs down to the reservoir at 23 about the inner side walls of casing 10 and is cooled thereby.

It is seen that the oil pressure and the oil flow in the lubricating and oil cooling system thus described are proportional to the motor speed, and hence they can be utilized for the purpose of operating the starting winding control switch. A preferred way of operating the switch 26 is by utilizing the movement of the unloader rod 49. Hence, I so shape this rod and provide it with one or more gear teeth 63 that it may turn the pinion 64 secured to a shaft 65 on which switch 26 is also coaxially secured. The rotary position of switch 26 is such that when the unloader rod 49 is in, holding valve 17 open, the switch 26 is closed, and when rod 49 moves out to allow valve 17 to close at about 60 per cent motor speed, switch 26 is rotated to open position. This assures that the starting winding of motor 11 will be cut out at a definite proper speed and also that it will be cut out at the same time that full load is applied to the motor. When the motor is shut down and the unloader mechanism operates to reopen valve 17, the starting winding will be reconnected and be ready for the next starting operation. The distance which switch 26 is rotated need be only about 30 degrees between completely open and completely closed positions and it is readily apparent that positive opening and closing operations can be obtained with the limited movement of the unloader rod.

Another switch-operating arrangement is represented in Figs. 4 and 5. Here 66 represents a small cup pivoted at 67 to a supporting bracket 68. This cup is balanced by a weight 69 so that when empty it is biased to the horizontal position shown in full lines, and when partially filled with oil, it tips to and remains in the dotted line position. This cup and its bracket 68 are adapted to be bolted by the bolt 70 so as to catch part of the oil that drains into pan 58, Fig. 1. The cup contains a small hole 71 in its bottom so that the oil in the cup will drain out in a short time. The switch 26 and its shaft 65 are arranged to be turned by the tilting action of cup 66 to open and close the switch. As thus arranged, the cup, when empty, will be in the horizontal position with switch 26 closed. Now, shortly after the motor starts, oil will start to fall into pan 58 and a part will be caught and quickly partially fill cup 66. The cup will then tip and open the starting winding switch. So long as the motor operates and pumps oil, the cup will be kept partially full in its tilted position. However, as soon as the motor and the oil flow stop, the oil in the cup will drain out and reclose the starting winding circuit. The dimensions of cup 66 will be small as compared to pan 58 and hence it will operate promptly and will not interfere in any material way with the flow of cooling oil through the motor.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A control system comprising a hermetically sealed container, a gaseous refrigerant in said container, a compressor pump for compressing said refrigerant and a split phase motor for driving said compressor also contained within said container, a supply of lubricating oil in the bottom of said container, an oil pump within said container driven by said motor for pumping said oil to the bearings of said motor and compressor for lubricating purposes, said motor having a starting winding, a switch in the circuit of said starting winding within said container and automatic means within said container responsive to the pumping of oil by said motor for opening said switch after the motor has been started and closing said switch when the motor is stopped.

2. In a control system, a gas compressor, a split phase motor for driving said compressor, said motor having a starting winding, a switch in the circuit of said starting winding, a hermetically sealed container in which all of the above named parts are contained, said container also containing a gaseous refrigerant to be compressed by said compressor and a quantity of lubricating oil, an oil pump driven by said motor for supplying such oil to said compressor and motor for lubrication purposes, means biasing said switch to a closed position and means responsive to the pumping of oil by said motor for overcoming said bias and opening said switch.

3. A control system for electric motor-driven refrigerator apparatus comprising a hermetically sealed gaseous refrigerant container, enclosing a compressor and a split phase motor for driving said compressor, said motor having a starting winding, a sealed mercury switch within said container in series with said starting winding and automatic means within said container responsive to the starting and stopping of said motor for respectively opening and closing said switch.

4. A control system for electric motor-driven apparatus comprising a hermetically sealed casing, a single phase split phase motor within said casing having main and starting windings, load apparatus in said casing driven by said motor, a pair of circuit wires sealed through the wall of said casing and connected across said main winding, a circuit including said starting winding and a sealed mercury switch connected in parallel with said main winding all completely within said casing, and automatic means within said casing responsive to the starting and stopping of said motor for respectively opening and closing said mercury switch.

5. Control apparatus for motor-driven refrigerator apparatus comprising a hermetically sealed casing, a split phase motor having main and starting winding circuits connected in parallel, a refrigerant compressor driven by said motor, said compressor having an inlet valve, an oil pump driven by said motor for supplying oil to a lubrication system for said motor and compressor, an unloader mechanism normally biased to hold said inlet valve open and having means responsive to the oil pressure as delivered by said oil pump for overcoming said bias to allow said valve to close when the motor is started and has reached a predetermined speed less than normal speed, a mercury tube switch in the starting winding circuit of said motor, said switch being associated with said unloader mechanism so as to be closed when the said inlet valve is held open and to be open when said inlet valve is allowed to close by said unloader mechanism, all of the above-named parts being contained within said hermetically sealed casing, a pair of circuit wires sealed through the wall of said casing for supplying electric energy to the parallel connected winding circuits of said motor, and a reservoir of lubricating oil contained within the bottom portion of said casing for supplying the oil pump and lubricating system.

6. A control system for motor-driven refrigerator apparatus comprising a hermetically sealed gaseous refrigerant container, a reservoir of lubricating oil in the bottom of said container, a vertical shaft split phase motor having main and starting windings within said casing above said oil reservoir, a refrigerant compressor above said motor within said container and driven by said motor, an oil pump at the bottom end of the motor shaft driven by said motor, an oil supply system for the motor and compressor supplied by said pump from said reservoir when said motor is in operation, said oil supply system including an outlet at the top of the compressor from which oil drains back to said reservoir, a mercury tube switch in series with the starting winding of said motor, means for respectively opening and closing said switch as the motor is started and stopped comprising a cup so placed as to catch oil as it returns to said reservoir, said cup being pivoted and so balanced on its pivot that when empty it is in one position and when partially filled it is in another position, said cup having a restricted opening in its bottom such that when the oil flow supplied by said pump stops, the cup will drain and return to its empty position.

WILLIAM E. RENNER.